US009081571B2

(12) United States Patent
Silva et al.

(10) Patent No.: US 9,081,571 B2
(45) Date of Patent: Jul. 14, 2015

(54) GESTURE DETECTION MANAGEMENT FOR AN ELECTRONIC DEVICE

(71) Applicant: Amazon Technologies, Inc., Reno, NV (US)

(72) Inventors: Jennifer Silva, Los Altos, CA (US); David A. Fotland, San Jose, CA (US); Matthew Miller, Mountain View, CA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 306 days.

(21) Appl. No.: 13/689,078

(22) Filed: Nov. 29, 2012

(65) Prior Publication Data

US 2014/0149754 A1 May 29, 2014

(51) Int. Cl.
*G06F 1/32* (2006.01)
*G06F 3/01* (2006.01)
*G06F 3/03* (2006.01)

(52) U.S. Cl.
CPC ............ *G06F 1/3212* (2013.01); *G06F 1/3228* (2013.01); *G06F 1/3293* (2013.01); *G06F 3/017* (2013.01); *G06F 3/0304* (2013.01); *Y02B 60/121* (2013.01); *Y02B 60/1292* (2013.01); *Y02B 60/32* (2013.01)

(58) Field of Classification Search
CPC ... G06F 1/3212; G06F 1/3228; G06F 1/3293; G06F 3/017; G06F 3/0304; Y02B 60/121; Y02B 60/1292; Y02B 60/32
See application file for complete search history.

(56) References Cited

U.S. PATENT DOCUMENTS

| 8,230,246 | B1 | 7/2012 | Sharkey et al. |
| 8,888,720 | B2 * | 11/2014 | Hudson ......................... 600/595 |
| 2009/0189867 | A1 | 7/2009 | Krah et al. |
| 2011/0180709 | A1 | 7/2011 | Craddock et al. |
| 2011/0312349 | A1 * | 12/2011 | Forutanpour et al. ......... 455/466 |
| 2012/0154303 | A1 | 6/2012 | Lazaridis et al. |
| 2013/0054505 | A1 * | 2/2013 | Ross et al. ...................... 706/46 |

OTHER PUBLICATIONS

International Search Report and Written Opinion from PCT Application Serial No. PCT/US13/71538 dated May 12, 2014.

* cited by examiner

*Primary Examiner* — M Elamin
(74) *Attorney, Agent, or Firm* — Novak Druce Connolly Bove + Quigg LLP

(57) ABSTRACT

The amount of power and processing capacity needed to process gesture input for a computing device is reduced by splitting the management of sensors, used to detect the input, among different processing components. A relatively high power processor system can monitor the sensors and determine the presence of gestures when the device is in an active state. When the device, or at least the processor system, enters a sleep mode, sensor management is transferred to a microcontroller connected to at least a portion of the sensors, such that the microcontroller can analyze the sensor data to determine the likelihood of a wake action being performed. In response to detecting a wake action, the microcontroller can contact a component such as a power management component to place the processor system in an active state, and enable the processor system to resume management of the sensors.

25 Claims, 6 Drawing Sheets

GESTURE DETECTION MANAGEMENT FOR AN ELECTRONIC DEVICE

BACKGROUND

People are increasingly interacting with computers and other electronic devices in new and interesting ways. One such interaction approach involves making a detectable motion or gesture with respect to a device, which can be detected using a camera or other such element. While image recognition can be used with existing cameras to determine various types of motion, the amount of processing needed to analyze full color, high resolution images is generally very high. This can be particularly problematic for portable devices that might have limited processing capability and/or limited battery life, such that image capture and processing at all times is not practical. In many situations a device will go into a low power or "sleep" mode in order to conserve power, wherein many components of the device, including various processors, will be in a low power mode, if not off entirely. Having processors in such a low power mode can prevent the device from detecting gestures, however, which can prevent the ability to use gestures to wake the device or otherwise indicate to the device to go back into an active state.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to interacting with an electronic environment. In particular, various approaches enable gesture-, action-, and/or motion-based input to be provided to an electronic device, even when the device is in a low power, sleep, or other such mode wherein at least some components or functionality of the device might not be readily available. In at least some embodiments, a device includes an application processor, primary sensor processing core, sensor processing component, or other such processing component that can manage one or more sensors on the device and analyze data from the one or more sensors to attempt to detect one or more gestures or inputs performed or provided by a user.

When a component such as a sensor processing component is to enter a sleep mode, or other such low power operational state, the sensor processing component, which can execute the primary sensor processing code in at least some embodiments, can contact a microcontroller (or microprocessor, etc.) associated with the sensors to cause that microcontroller to take responsibility for managing the sensors. In some embodiments, the primary sensor processing code can be executed by an application processor or other such component to perform similar functionality. The microcontroller can do at least basic analysis in order to determine likely wake actions performed by a user, for example, and when a level of confidence or other such metric meets at least a minimum threshold or other such criterion, the microcontroller can cause the sensor processing component to enter the active mode and resume management of the sensors. If the event is determined to correspond to a wake action, the sensor processing component can resume management of the sensors. If the event is determined to not correspond to a wake action, management of the sensors can stay with the microcontroller and the sensor processing component can return to the sleep state. Such an approach enables the device to detect wake actions while in a low power mode, even if the typical device processor used to determine such gestures is also in a low power state and thus unavailable to detect the wake event.

Various other applications, processes and uses are presented below with respect to the various embodiments.

Figure 1:
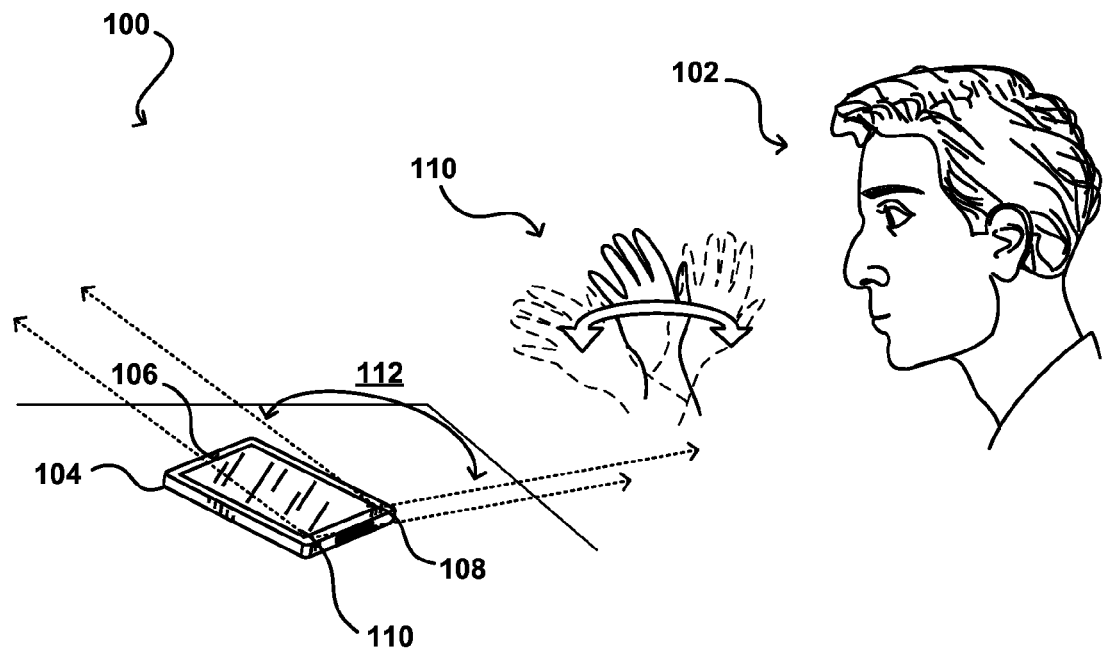
FIG. 1 illustrates an example environment in which various aspects can be implemented in accordance with various embodiments.

FIG. 1 illustrates an example situation 100 wherein a user 102 would like to provide gesture- and/or motion-based input to a computing device 104. Although a portable computing device (e.g., a smart phone, an electronic book reader, or tablet computer) is shown, it should be understood that various other types of electronic device that are capable of determining and processing input can be used in accordance with various embodiments discussed herein. These devices can include, for example, notebook computers, personal data assistants, cellular phones, video gaming consoles or controllers, and portable media players, among others. In this example, the computing device 104 has at least one camera 106 operable to perform functions such as image and/or video capture for purposes such as self-portrait capture or video chat. The device also includes at least two gesture sensors 108, 110 operable to capture lower resolution images for purposes such as gesture detection. The camera, gesture sensors, and any other such image capture elements on the device may be, for example, a camera, a charge-coupled device (CCD), a motion detection sensor, or an infrared sensor, or can utilize another appropriate image-capturing technology. Further, other numbers of components, such as one or four gesture sensors, can be used as well within the scope of the various embodiments.

In this example, the user 102 is performing a selected motion or gesture using the user's hand 110, such as to perform a "wave to wake" or similar gesture that can cause the device to enter into an active, normal, or other such state from a low power, sleep, or other such state. The motion can be a specific motion or one of a set of motions or gestures recognized by the device to correspond to a particular input or action. If the motion is performed within a viewable area or angular range 112 of the pair of gesture sensors 108, 110 on the device, the sensors can capture one or more images including the motion, such that the device can analyze the images using at least one image analysis or feature recognition algorithm and determine movement of a feature of the user between subsequent frames. This can be performed using any process known or used for determining motion, such as locating "unique" features in one or more initial images and then tracking the locations of those features in subsequent images, whereby the movement of those features can be compared against a set of movements corresponding to the set of motions or gestures, etc. Other approaches for determining motion- or gesture-based input can be found, for example, in co-pending U.S. patent application Ser. No. 12/332,049, filed Dec. 10, 2008, and entitled "Movement Recognition and Input Mechanism," which is hereby incorporated herein by reference. If a motion or gesture is detected that matches a known motion or gesture, a determination can be made of a corresponding input to provide to software executing on the computing device. This can include, for example, sending an input to a user interface application executing on the device, whereby a user can provide input to the user interface application by performing one or more gestures within a field of view of one or more gesture cameras or other such elements.

Other types of wake actions can be detected as well within the scope of the various embodiments. These can include, for example, audio commands issued by a user that are detected by at least one microphone or other audio sensor of the device. Another wake action can include a specific movement or reorientation of the device, as may be detected using at least one motion or orientation sensor. Still another wake action can involve the user touching, or almost touching, the device, as may be detected using a pressure sensor, capacitive touch sensor, ultrasonic sensor, etc.

Figure 2:
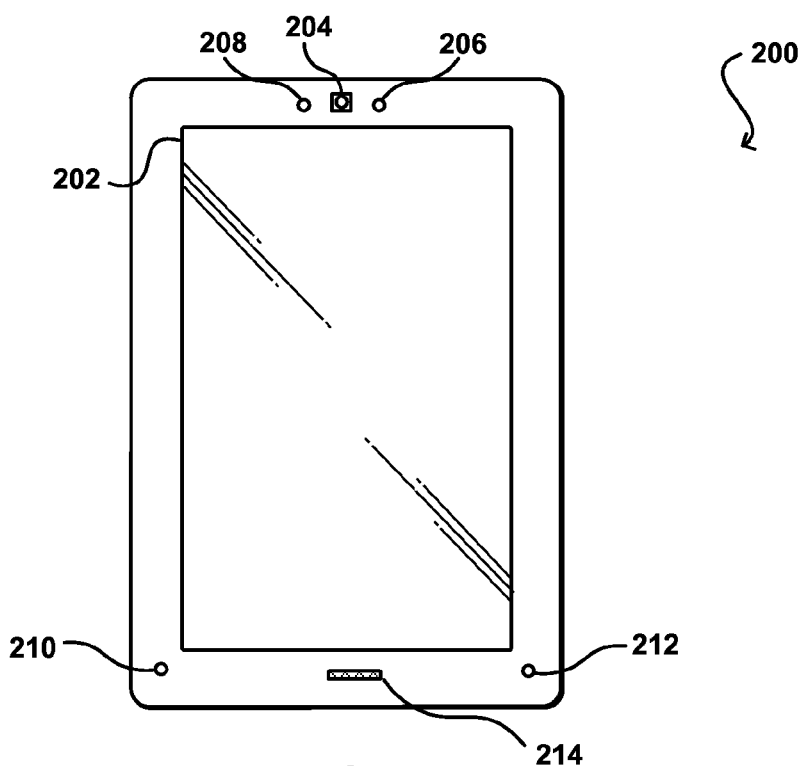
FIG. 2 illustrates an example computing device that can be used in accordance with various embodiments.

FIG. 2 illustrates an example computing device 200 that can be used in accordance with various embodiments. In this example, the device has a conventional digital camera 204 on the same side of the device as a display element 202, enabling the device to capture image information about a user of the device during typical operation where the user is at least partially in front of the display element. In addition, there are two gesture sensors 210, 212 positioned on the same side of the device that can be used to determine gesture input from the user when at relatively the same location. It should be understood that there can be additional cameras, gesture sensors, or other such elements on the same or other sides or locations of the device as well within the scope of the various embodiments, such as may enable gesture or image input from any desired direction or location with respect to the device. A camera and at least one gesture sensor can be used together advantageously in various situations, such as where a device wants to enable gesture recognition at relatively low power over an extended period of time using the gesture sensor(s), and perform facial recognition or other processor and power intensive processes at specific times using the conventional, higher resolution camera.

This example device also illustrates additional elements that can be used as discussed later herein, including a light sensor 206 for determining an amount of light in a general direction of an image to be captured and an illumination element 208, such as a white light emitting diode (LED) or infrared (IR) emitter as will be discussed later herein, for providing illumination in a particular range of directions when, for example, there is insufficient ambient light determined by the light sensor. The device also includes a microphone 214 enabling voice or audio input to be provided to the device. Various other elements and combinations of elements can be used as well within the scope of the various embodiments as should be apparent in light of the teachings and suggestions contained herein.

As discussed above, however, analyzing data such as image data captured by one or more cameras can be very processor, resource, and power intensive, particularly for mobile devices, such that for at least some devices it is not practical to continually operate conventional components for gesture detection. When a device goes into a low power mode, it can be desirable for components with the highest rates of power consumption to go into a low power mode, sleep state, or other such configuration wherein the components draw little to no power. While placing components such as processors in a low power state can conserve a significant amount of power, such usage can hinder the ability of the device to perform specific tasks. For example, in conventional devices a component such as an application processor (i.e., a processor that processes data instead of controlling functions, like a database server) might be used to monitor and analyze sensor data in order to determine when a motion is being performed, in order to determine the corresponding input signal to be provided to an application executing on the device. If the processor is not in a normal or active operational state, however, the processor can be unable to evaluate sensor data to determine whether a gesture such as a "wake" gesture is being performed.

In some embodiments the detection of motion by a sensor can cause the application processor, or another such component, to enter a normal operational mode in order to determine whether the motion corresponds to a wake gesture, and if not the component can go back into a low power mode. Such an approach can result in the processor continually being placed into a normal operational mode, particularly for a portable device where movement of the device can cause a sensor to detect motion, which can waste a significant amount of power and resources not only for the time the processor is in the normal operational state, but also for the times in which the processor is changing into the operational state, and then back to the low power state. While the use of additional sensor data can potentially limit the number of these and other false positives, the data from the sensors still needs to be analyzed which would require a processor to stay in an operational state.

Figure 3:
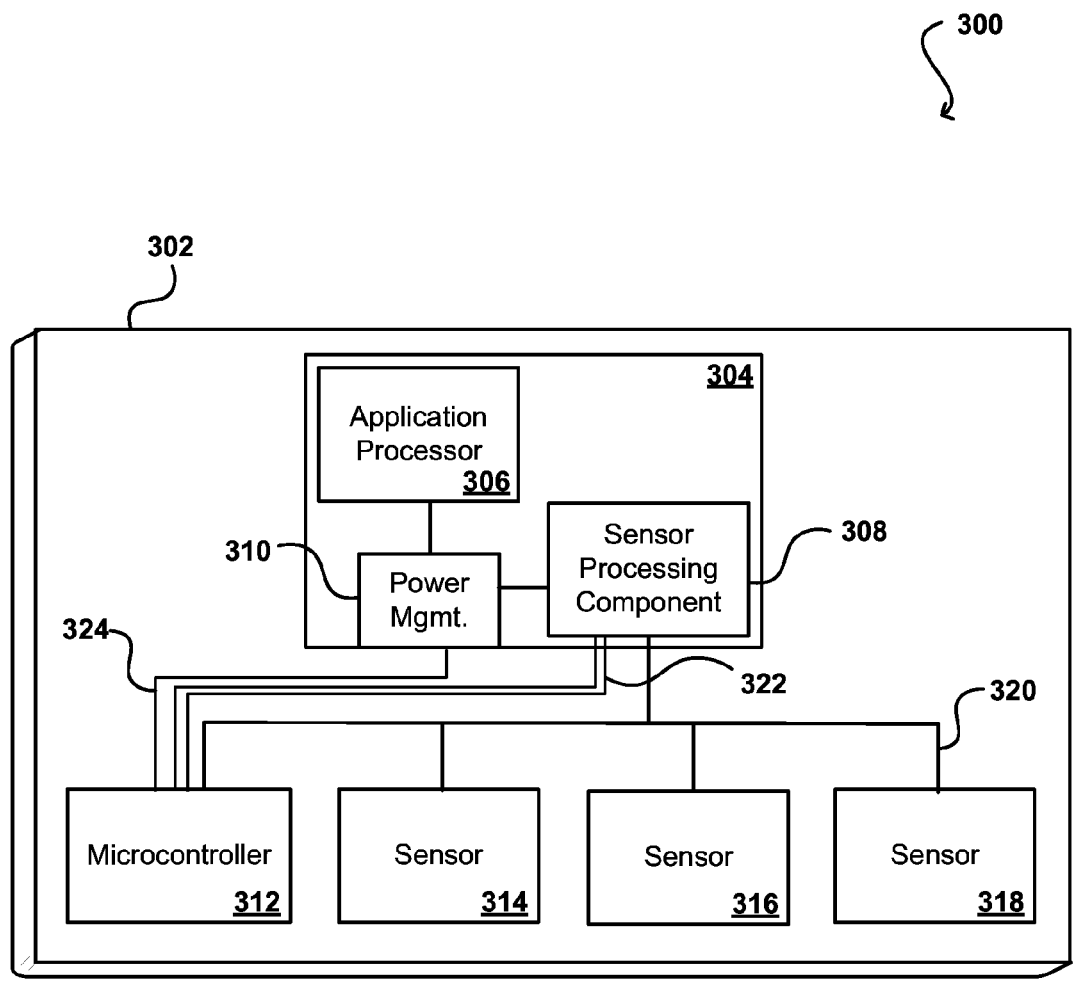
FIG. 3 illustrates an example configuration of components of a computing device that can be used in accordance with various embodiments.

FIG. 3 illustrates an example configuration 300 of components that can be used with a computing device in accordance with various embodiments. It should be understood that there can be various other components used as well, in various configurations, as are known for providing various types of functionality in a computing device. In this example, the computing device contains a processor subsystem 304, such as a chipset or multi-processor core, that contains various processors or processor cores that can be utilized for specific types of functionality. For example, the processor subsystem as illustrated contains at least one application processor 306 for processing data and instructions, as could a conventional application processor in a computing device. The subsystem in this example also contains a dedicated sensor processor 308, co-processor, processor core, or sensor processing component configured to execute primary sensor processing code, for example, which can be used to analyze data received from various sensors 314, 316, 318 on the device 302 for purposes such as gesture recognition.

The use of a dedicated sensor processing component can have various advantages, including improved speed of gesture recognition and the ability of the application processor to focus on other tasks. A potential downside is that the sensor processor 308 can be a relatively heavy-duty processor core, which can still consume a significant amount of power. Further, when the processor subsystem enters a low power mode the sensor processor 308 will go into a sleep mode along with the application processor 306, and thus cannot support events or actions such as "wave to wake" gestures that may be performed while the processor subsystem is in the lower power mode.

The device of FIG. 3 enables the computing device to utilize a separate microcontroller 312 in order to provide for gesture detection during periods when the processor subsystem 304 of the device is in a low power mode. In at least some embodiments, the microcontroller 312 can be connected to the processor subsystem 304 using an appropriate line or sensor bus 320, such as an I²C bus, enabling communications between the microcontroller 310 and, for example, the sensor processor 308. The microcontroller can be configured to operate in a normal mode even when the device and/or the processor sub-system are in a low power mode, and the microcontroller can consume relatively little power with respect to the processors or processor cores of the processor sub-system. The microcontroller 312 together with the sensors 314, 316, 318 can be referred to as a micro sensor hub that can be controlled by the sensor processor 308.

As illustrated, there can be multiple sensors 314, 316, 318, of the same or different types, connected to the microcontroller 312 and the sensor processor 308 using at least one sensor bus 320. When the device is in an awake state, the sensor processor 308 can control the sensors, such as to determine an operational state of the sensors, when the sensors should attempt to capture data, etc. The sensor processor 308 then can receive and analyze data captured by one or more of the sensors. When the device goes into a sleep mode, for example, the sensor processor 308 can contact the microcontroller 312 to indicate that the microcontroller is now in charge of managing the sensors. The microcontroller then can manage and/or control the sensors and analyze the sensor data in order to attempt to detect wakeup events or other such occurrences. As is discussed elsewhere herein in more detail, a wakeup event can include not only a wave to wake motion performed by a user, but also can correspond to a wakeup voice command issued by the user, a specific motion of the computing device such as a flick or tilt, or another such occurrence that can be detected by at least one sensor of the device.

While the processor sub-system is in an active state, the sensor processor can communicate with the sensors and the microcontroller 312 over the I²C bus 320 to obtain sensor data and manage sensor operation, among other such aspects. In this state, the microcontroller 312 acts like another device on the I²C bus. When the sensor processor 308 is in a sleep state, however, the control passes to the microcontroller 312 and the microcontroller then acts as the master for the sensors, communicating with the sensors over the same I²C bus 320 (in at least this example). It can be necessary in at least some embodiments to pass sensor management to the microcontroller because all the cores within the processor sub-system 304, including the application processor 306, a power management component 310, and the sensor processor 308, will be in a sleep state when the processor sub-system is in a sleep state. The application processor or sensor processor in this state cannot determine wake gestures because the processors are not obtaining sensor data.

In this example, a pair of general purpose input/output lines (GPIOs) 322 enables the sensor processor 308 to communicate directly with the microcontroller 312. The GPIOs, which each function as a generic pin on the chipset 304, can be controlled through software to enable those GPIOs to function as request/grant lines for passing sensor control. In some embodiments, as discussed later herein, one of the GPIO lines can be used when the sensor processor is controlling the sensors, and another can be used when the microcontroller is managing the sensors. A request can be sent between the sensor processor 308 and the microcontroller asking the other to take over control of the I²C bus 320, and thus the sensors 314, 316, 318. A user or application can utilize an interface to activate or deactivate functionality on the device, which can be received as a series of messages to the sensor processor 308. The interface can enable communication with the microcontroller 312 to determine relevant services (e.g., for wake events) at the microcontroller level. Such an approach enables the sensor processor to function as the middle man for configuration the microcontroller instead of the application processor 306 or other such component.

When the sensor processor 308 is in sleep mode, the microcontroller can obtain and analyze sensor data from one or more of the device sensors 314, 316, 318 to attempt to determine a wake gesture. As discussed, this can include motion detected using a camera or ultrasonic sensor, audio detected using a microphone, device orientation changes using a motion sensor, etc. When the microcontroller 312 analyzes the sensor data and recognizes what appears to be a wake gesture, for example, the microcontroller can send an interrupt to a power management component 310 of the processor sub-system 304 to wake up the processor sub-system and the processors or processor cores. In some embodiments the microcontroller will only send an interrupt when a full gesture is detected, while in other embodiments the microcontroller might have to detect what appears to be a gesture with a specified minimum amount of certainty, for example, at which point the microcontroller can wake up the processor sub-system and make the sensor data available for analysis by the sensor processor 308, for example, which can perform a more robust and/or accurate analysis. The sensor processor in some embodiments might also obtain data from other sensors to assist in the analysis. For example, if motion was detected using a camera, the sensor processor might obtain data from one of the device motion sensors to determine whether the detected motion corresponded to motion of the device, at which point the processor might determine that the motion did not correspond to a wave to wake or similar gesture. Similarly, if the sensor processor can determine that the device did not move during that time, had little motion, or moved in a different direction, the sensor processor might be able to determine with more certainty that the detected motion was an actual wake gesture performed by a user. Various other types of analysis and conclusions can be reached with these and other types of data within the scope of the various embodiments.

Thus, in at least some embodiments the microcontroller can do a first analysis of data from one or more sensors to attempt to detect a wake action, and when an item or action of interest occurs the microcontroller can cause the sensor processor 308 to enter a wake state, whereby the sensor processor can analyze data from additional sensors, as well as other information such as models, algorithms, etc., to determine whether the item or action of interest was actually a wake action, and then can notify the application processor 306 and/or other components when the item or action of interest is determined to correspond to a wake action.

In some embodiments the microcontroller 312 might off-load some of the analysis from the application processor and/or sensor processor even when those processors are in an active state. Based on current device load, configuration, or other such information, the application processor or sensor processor might decide to allow the microcontroller to continue monitoring the sensors and then send an interrupt or other communication when a potential gesture is detected. At some point one of the processors or processor cores might decide to take over the sensor management, at which time a processor such as the sensor processor 308 can communicate with the microprocessor through an appropriate communication channel, signaling scheme, handshake, request/grant approach, or other such mechanism in order to cause a handover of controller from the microcontroller to the sensor processor. A similar communication can be used to transfer controller from the sensor processor to the microcontroller. In some embodiments, the sensor processor might indicate to the microcontroller that the microcontroller should monitor for a certain type of gesture or event, such as to analyze captured image data for specific motion gestures, while the sensor processor or another component monitors other sensor data for other types of actions or events. If multiple microcontrollers are used, the sensor processor or application processor can determine which microcontrollers or other such components are used for various purposes at various times.

In some embodiments the microcontroller might detect a gesture or event and determine to wake up the sensor processor by contacting the power management component 310 over a direct interrupt line 324. The power management component can wake up the sensor processor 308, for example, and cause the sensor processor to query the microcontroller 312 to determine information about the event and determine whether or not to act on the information. In at least some embodiments, the data can be stored in a sensor buffer with a timestamp, enabling correlation of the data with specific events. In at least some embodiments, the microcontroller can maintain control of the sensors and sensor bus even when the sensor processor is in an active state, until such time as the sensor processor indicates to the microcontroller that the sensor processor is taking control, or provides another such communication over the same or a different communication path. A similar mechanism can be used when the application processor or sensor processor are awoken into an active state by another mechanism or component, and at least one of the sensors wants to take control of at least a portion of the sensor management on the device.

An added benefit of using a microcontroller that consumes less power than a device processor is that the microcontroller can act as a filter for the device processor, preventing a significant number of detected events or actions from waking the device processor, or having the device processor perform one or more actions, by first determining that those detected events to not correspond to gestures or other such inputs. A microcontroller might determine that on the order of ninety percent or more of the detected events do not correspond to legitimate gestures, and thus can prevent a significant amount of power consumption by not contacting device processors for these events. There can still be information for a number of false positives passed on to a device processor, but the number can be significantly reduced such that the power consumed for these false positives can be significantly less than for when the microcontroller is not being used to filter out data for false positives.

In different embodiments, a microcontroller might have different confidence or certainty thresholds, which in at least some embodiments can be configurable by a user, application, or other such entity. In some embodiments the certainty thresholds might depend at least in part upon the type of sensor data available, such as whether accelerometer or motion data is available to the microcontroller with image data, etc. Changing the threshold can reduce the number of false positives, but the threshold should not be set such that a number of legitimate wake gestures will be ignored as being false positives due to factors such as room lighting or device motion, for example. In some cases, a device might include two thresholds, where events with confidences below a first threshold are ignored as false positives, events with confidences above a second threshold are regarded as legitimate gestures, and events with confidences between these thresholds are regarded as potential gestures that require further analysis, and as such might be analyzed with additional data by an application processor or sensor processor, etc.

In some embodiments, certain types of data are better handled by certain components, which can determine at least part of the data analyzed by each component in certain situations. For example, image data captured by full resolution cameras might be advantageously handled by the gesture sensor, as the required bandwidth and connectivity already exists between the cameras and device processors but the connectivity to the microcontroller can quickly be overwhelmed. For lower resolution gesture sensors, for example, the microcontroller might be able to manage the detection and analysis in at least some situations. The microcontroller can also obtain lighting, motion, and environment data from the sensors and place at least a portion of that data in an $I^2C$ register, for example, for subsequent retrieval by an application or sensor processor in response to a potential gesture being detected by the microcontroller.

In at least some embodiments there can be an interface between the application processor and the microcontroller that can be configurable and/or extensible to add or update functionality. For example, messaging can be added for times when processors are placed into an active state and want to obtain data about the current environment, such as may include lighting or motion data, etc. The data that is obtained can be processed or raw, and in at least some embodiments can be requested all the way back up to the application processor. This communication channel can also be used as a conduit for transferring other information as well, within the scope of the various embodiments.

In one embodiment, the microcontroller 312 includes logic for performing various tasks, as may include acting as a master or slave with respect to sensor control, performing gesture detection (i.e., full or partial), performing sensor data tuning and acquisition, and performing various debugging and/or logging functions. The microcontroller can also contain various components, as may include a sensor data buffer, $I^2C$ register mapping components, gesture libraries for use in recognizing wake and other gestures, etc. A microcontroller can include other components as well, such as a bootloader that uploads new application images and configuration data, as well as a gesture algorithm manager and drivers for the various communication channels, among other such options. The microcontroller in some embodiments can also include logic for smoothing or otherwise pre-processing data received from various sensors.

In some embodiments various rules can be used by the microprocessor and/or sensor processor to manage master control, among other such aspects. For example, a microcontroller unit (MCU) can monitor the value of a parameter such as SPC_Master, which refers to the state of the sensor processing component ("SPC"). If SPC_Master is high, then MCU_Master will immediately go low. This can be interrupt driven to ensure it has priority. The sensor processing component (e.g., a macro sensor processor) in this example is only master when MCU_Master is low and SPC_Master is high. As discussed, the SPC_Master can correspond to one of the GPIOs, with the MCU_Master corresponding to the other GPIO.

The sensors managed by the various processors can include various types of sensors for detecting and/or measuring various types of information. These sensors can include, for example, one or more cameras, relatively low resolution gesture sensors, accelerometers, electronic gyroscopes, inertial sensors, electronic compasses, microphones, ultrasonic sensors, magnetometers, ambient or infrared light sensors, proximity sensors, temperature sensors, etc. The processors can also control various other components of the device, such as LEDs or other light emitters, camera flash mechanisms, and the like.

Figure 4:
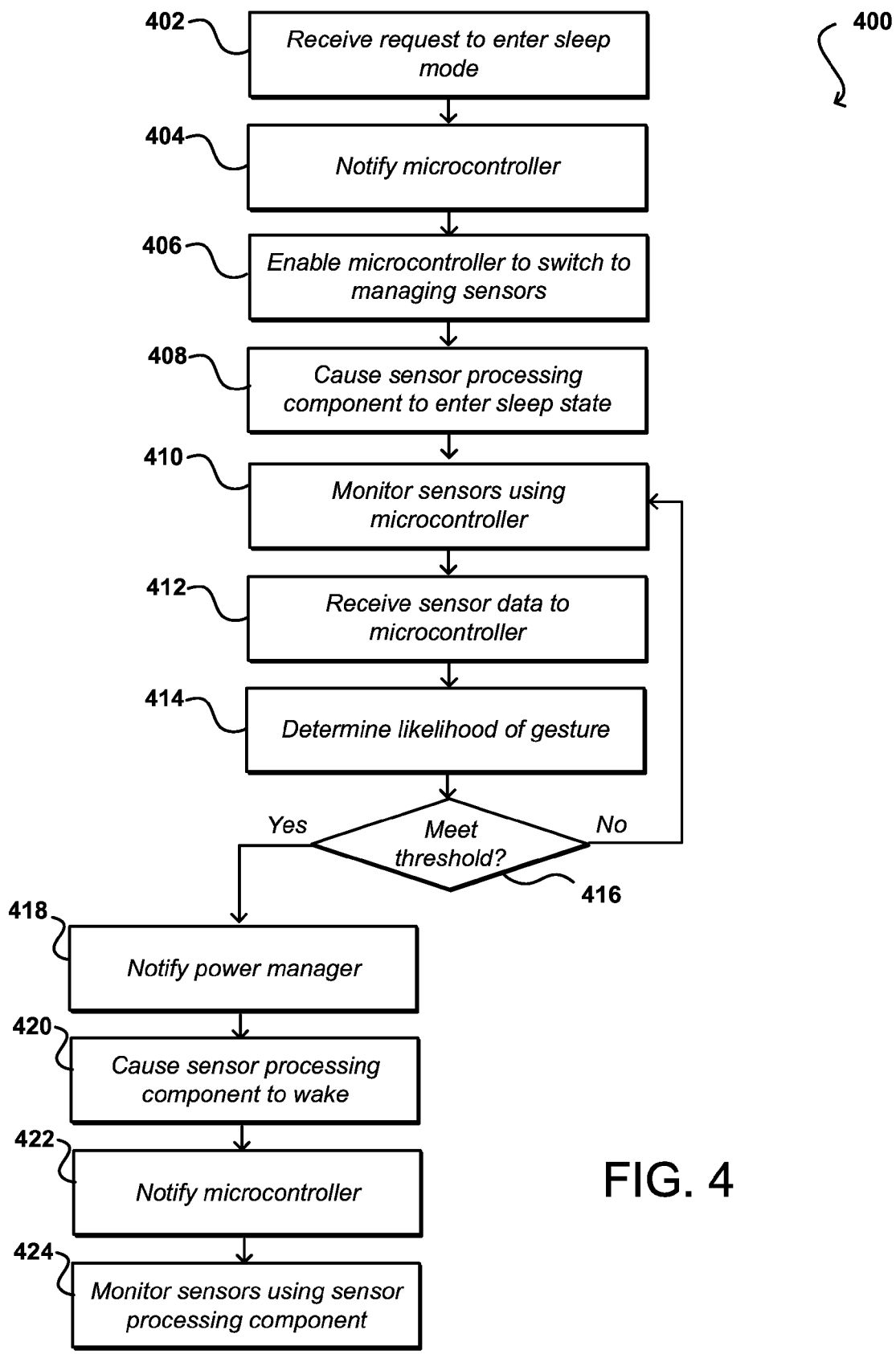
FIG. 4 illustrates an example process for monitoring for gestures that can be used in accordance with various embodiments.

FIG. 4 illustrates an example process 400 for enabling gesture input to a computing device in different operational modes that can be used in accordance with various embodiments. It should be understood that, for any process discussed herein, there can be additional, fewer, or alternative steps performed in similar or alternative orders, or in parallel, within the scope of the various embodiments unless otherwise stated. In this example, a request is received 402 indicating that the device, or at least a processing component of the device, is to enter a sleep mode. As discussed, this can be in response to input from a user or application, or in response to an event such as a passage of time or reaching an amount of remaining battery life. As discussed, the processing component in some embodiments can include an application processor and a sensor processing component, and the sleep state can include setting each of these processing components to a sleep state or other such low power mode.

In response to receiving the request, the sensor processing component in this example can notify 404 and/or assert to a microcontroller associated with the sensors, or part of a micro sensor hub, for example, that the microcontroller should take control of sensor management, functioning as a master for purposes of sensor management. The microcontroller can then switch 406 to operating as a master and is managing the sensors, and the sensor processing component can be caused 408 to enter a sleep state. The sensors can then be monitored 410 by the microcontroller.

While the microcontroller is monitoring the sensors, sensor data can be received 412 to the microcontroller and the likelihood of a wake gesture being detected by the sensors can be determined 414 at least in part by analyzing the data from at least some of the sensors detecting the potential gesture. If it is determined that the likelihood does not at least meet a minimum confidence threshold 416, or other such metric or criteria, the monitoring can continue. If, on the other hand, it is determined that the likelihood at least meets a minimum confidence threshold, a power management component associated with the sensor processing component can be notified 418, which can cause 420 the sensor processing component to enter an active state. The sensor processing component can notify 422 the microcontroller that the sensor processing component will resume managing the sensors, and the sensor processing component can resume monitoring the sensors 424. In some embodiments, instead of the sensor processing component notifying the microcontroller, the microcontroller can release control of the bus and then wake up the processor. The sensor processing component can determine the microcontroller state and determine that the sensor processing component should take over sensor management. Various other approaches can be used as well within the scope of the various embodiments.

As mentioned, in some embodiments the microcontroller might only make an initial estimate on the likelihood of the gesture, or the gesture might only have met a minimum confidence threshold. In these and other such cases, the sensor processing component can obtain sensor data from at least one appropriate sensor cache, as well as other relevant data, to determine whether the gesture likely corresponded to a wake gesture. If not, the sensor processing component might leave control with the microcontroller and re-enter sleep mode. If so, the sensor processing component can notify the microcontroller that it is entering an active state as discussed above, and can take control over at least a portion of the gesture determination for at least a minimum period of time.

Figure 5A:
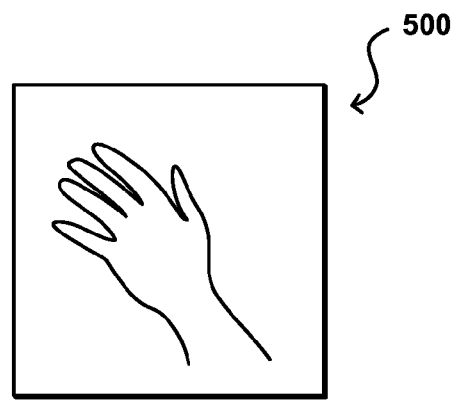
FIGS. 5(a), 5(b) and 5(c) illustrate examples of images of a hand in motion that can be captured in accordance with various embodiments.
Figure 5B:
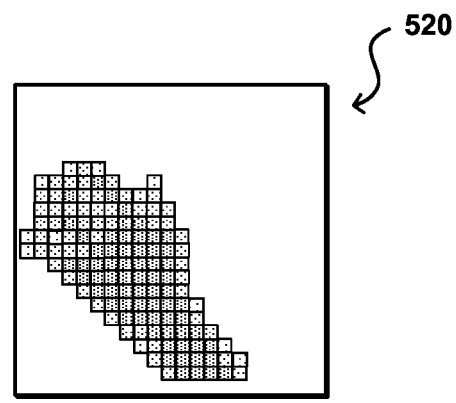
Figure 5C:
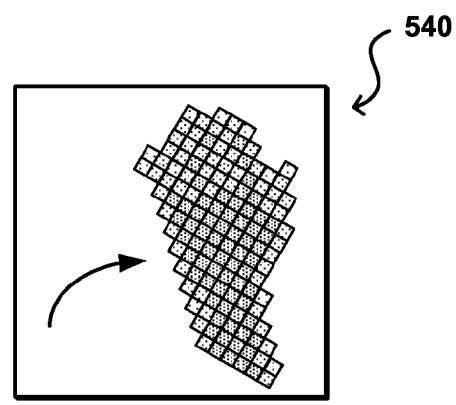

As discussed, in at least some embodiments a wake gesture can include a "wave" motion performed by a user. In many cases, the ability to recognize such gestures will not often require high resolution image capture. For example, consider the image 500 illustrated in FIG. 5(a). While the analysis of a high quality image of the hand can provide for accurate gesture determination, the analysis of such images can be quite processor and power intensive as discussed elsewhere herein. As can be seen in the image 520 of FIG. 5(b), however, even a very low resolution image can be used to determine gesture input with a reasonable level of confidence. In FIG. 5(b), the device might not be able to recognize whether the hand is a man's hand or a woman's hand, but can identify the basic shape and location of the hand in the image such that changes in position due to waving or other such motions, as illustrated in image 540 of FIG. 5(c), can quickly be identified with sufficient precision. Even at this low resolution, the device likely would be able to tell whether the user was moving an individual finger or performing another such action. Further, any level of motions detected to follow a particular path or pattern can be identified as a potential gesture in various embodiments. In one embodiment, a light sensor with on the order of one to three pixels, with many levels, can be used with an LED control. As long as the hand is of a sufficient size and/or width, the lighting is sufficient, and the hand moves within a specified velocity range, the hand motion can be detected using an appropriate algorithm. The detection can involve a spike in a measurement signal or other such indicia.

In some embodiments multiple gesture sensors can be utilized and synchronized in order to enable tracking of objects between fields of view of the gesture sensors. In one embodiment, synchronization commands can be sent over the $I^2C$ bus, or a dedicated line can be used to join the two sensors, in order to ensure synchronization.

In some embodiments, a user might be able to provide an audio wake event, such as by speaking a wake command, humming or whistling a specific tune, tapping a specific audio beat pattern, or performing another such action. A microphone or other audio sensor of the device can detect the audio which then can be analyzed by the microcontroller or another such processing element to attempt to match the audio input against one or more audio patterns for wake events. In some cases the audio matching can use conventional audio matching algorithms, as may utilize unique features in the audio frequency. In other embodiments, the device might utilize voice and/or speech recognition to attempt to determine the word(s) spoken, as well as potentially the identity of the person speaking the words. Various other audio commands or actions can be utilized as well.

In some embodiments the user can perform a motion of the device that can be detected as a wake event. For example, the user can quickly flip or tilt the device as may be detected by an accelerometer, electronic gyroscope, electronic compass, inertial sensor, or other motion sensor, and aspects such as the speed, range, and/or direction can be analyzed to attempt to detect a wake event. In other embodiments specific patterns such as a device being picked up from a table can be analyzed and matched against a library of paths or patterns to detect wake events. The user could alternatively perform a double tap or other such action, which could be detected by an accelerometer, inertial sensor, or other such component of the computing device.

In some embodiments, a specific tap, motion on (or near) the device, series of touches, or touch in a specific location can be detected as a wakeup event. The sensors in this case can include sensors such as capacitive touch sensors, pressure sensors, ultrasonic sensors, and the like. Various other types of input that can be detected by at least one device sensor can be used as well within the scope of the various embodiments.

Figure 6:
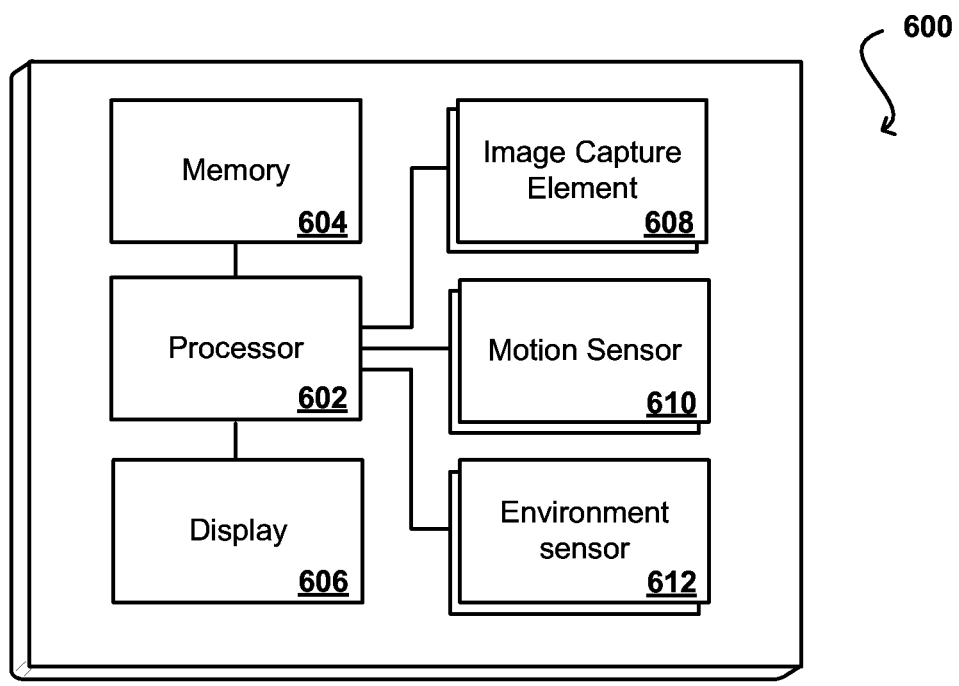
FIG. 6 illustrates a first example configuration of components of a computing device that can be used in accordance with various embodiments.

In order to provide various functionality described herein, FIG. 6 illustrates an example set of basic components of a computing device 600, such as the device 104 described with respect to FIG. 1. In this example, the device includes at least one central processor 602 for executing instructions that can be stored in at least one memory device or element 604. As would be apparent to one of ordinary skill in the art, the device can include many types of memory, data storage or computer-readable storage media, such as a first data storage for program instructions for execution by the processor 602, the same or separate storage can be used for images or data, a removable storage memory can be available for sharing information with other devices, etc. The device typically will include some type of display element 606, such as a touch screen, electronic ink (e-ink), organic light emitting diode (OLED) or liquid crystal display (LCD), although devices such as portable media players might convey information via other means, such as through audio speakers. In at least some embodiments, the display screen provides for touch or swipe-based input using, for example, capacitive or resistive touch technology.

As discussed, the device in many embodiments will include multiple image capture elements 608, such as one or more high resolution cameras that are able to image a user, people, or objects in the vicinity of the device. The image capture elements can also include at least one separate gesture sensor operable to capture image information for use in determining gestures or motions of the user, which will enable the user to provide input through the portable device without having to actually contact and/or move the portable device. An image capture element can include, or be based at least in part upon any appropriate technology, such as a CCD or CMOS image capture element having a determine resolution, focal range, viewable area, and capture rate. As discussed, various functions can be included on with the gesture sensor or camera device, or on a separate circuit or device, etc. A gesture sensor can have the same or a similar form factor as at least one camera on the device, but with different aspects such as a different resolution, pixel size, and/or capture rate. While the example computing device in FIG. 1 includes one image capture element and two gesture sensors on the "front" of the device, it should be understood that such elements could also, or alternatively, be placed on the sides, back, or corners of the device, and that there can be any appropriate number of capture elements of similar or different types for any number of purposes in the various embodiments. The example device can include other types of sensors as well, such as one or more motion sensors for detecting a change in position and/or orientation of the device. These sensors can include, for example, accelerometers, electronic gyroscopes, electronic compasses, inertial sensors, and the like. The device also can include at least one environment determining sensor element 612, as may include one or more light sensors for detecting ambient light or intensity, temperature or pressure sensors, etc.

The example device can include at least one additional input device able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual (e.g., gesture) and audio (e.g., spoken) commands such that a user can control the device without having to be in contact with the device.

Figure 7:
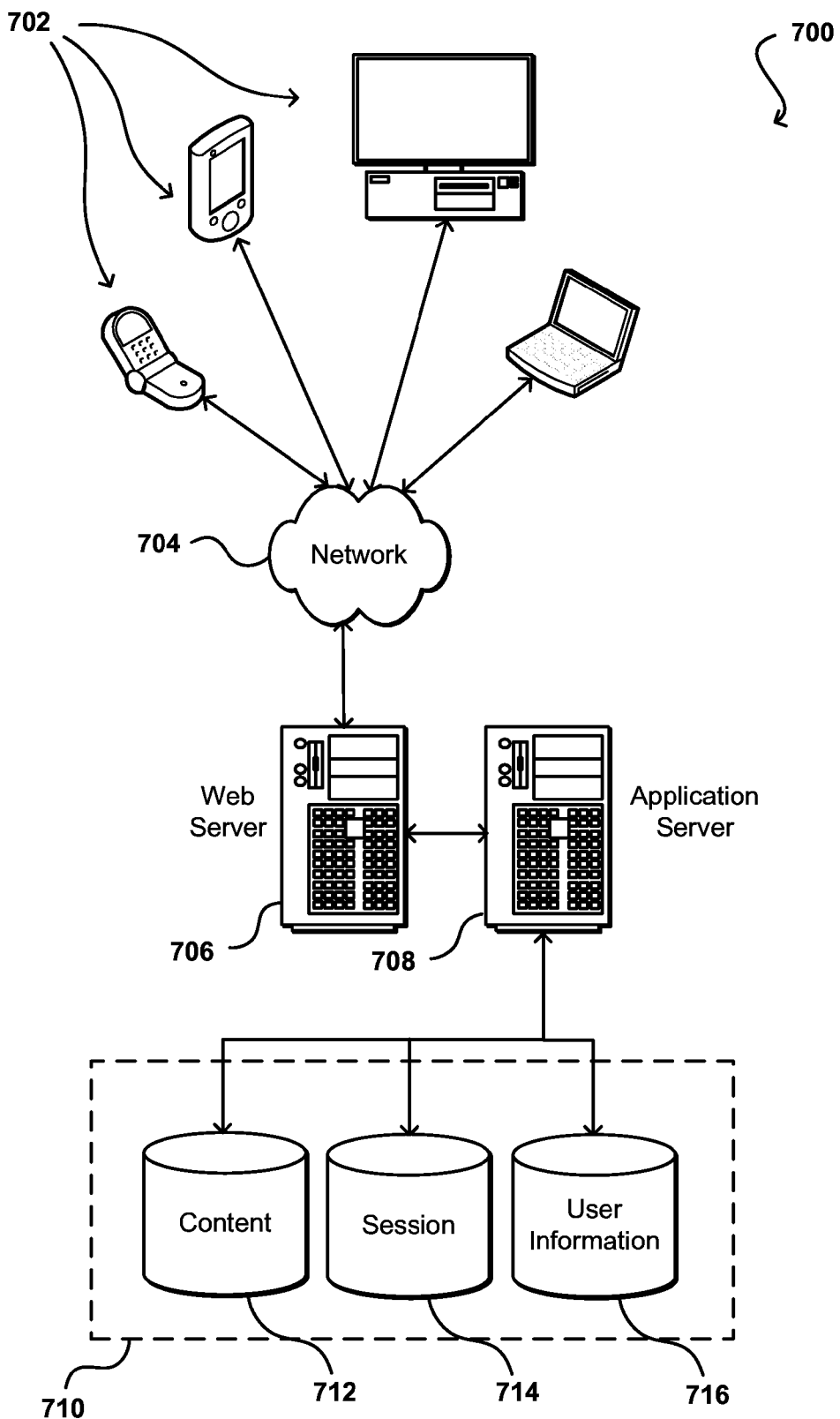
FIG. 7 illustrates an example environment in which various embodiments can be implemented.

As discussed, different approaches can be implemented in various environments in accordance with the described embodiments. For example, FIG. 7 illustrates an example of an environment 700 for implementing aspects in accordance with various embodiments. As will be appreciated, although a Web-based environment is used for purposes of explanation, different environments may be used, as appropriate, to implement various embodiments. The system includes an electronic client device 702, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 706 for receiving requests and serving content in response thereto, although for other networks, an alternative device serving a similar purpose could be used, as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 708 can include any appropriate hardware and software for integrating with the data store 710 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 706 in the form of HTML, XML or another appropriate structured language in this example. The handling of all requests and responses, as well as the delivery of content between the client device 702 and the application server 708, can be handled by the Web server 706. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing content (e.g., production data) 712 and user information 716, which can be used to serve content for the production side. The data store is also shown to include a mechanism for storing log or session data 714. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD)

or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
   a plurality of device sensors;
   a processor subsystem including at least an application processor and a sensor processing component;
   a microcontroller connected to the plurality of device sensors and the processor subsystem; and
   at least one memory device including instructions operable to be executed to perform a set of actions, enabling the computing device to:
     monitor, using the sensor processing component, sensor data captured by at least one of the plurality of device sensors during at least a portion of a time interval in which the processor subsystem is in an active state;
     receive, at the processor subsystem, an instruction to enter a sleep state;
     determine that the instruction is received;
     cause the sensor processing component to notify the microcontroller to take over the monitoring of the sensor data;
     cause the processor subsystem to enter the sleep state;
     monitor the sensor data using the microcontroller while the processor subsystem is in the sleep state;
     recognize, using the microcontroller, a wake action performed with respect to the computing device, based at least in part upon the sensor data, the wake action not requiring any physical contact with the computing device;
     determine that a confidence level for the recognized wake action satisfies a threshold value; and
     cause the processor subsystem to enter an active state and the sensor processing component to resume monitoring the sensor data while in the active state.

2. The computing device of claim 1, wherein the processor subsystem further includes a power management component, and wherein notifying the processor subsystem in response to recognizing the wake action includes notifying the power management component, the power management component configured to cause the sensor processing component to enter the active state.

3. The computing device of claim 1, wherein the notifying of the microcontroller and the notifying of the sensor processing component are performed using a pair of general purpose input/output lines connecting the microcontroller and the sensor processor.

4. A computing device, comprising:
   at least one device sensor;
   a processor subsystem including at least a sensor processing component connected to the at least one device sensor;
   a microcontroller connected to the at least one device sensor and the processor subsystem; and
   at least one memory device including instructions operable to be executed to perform a set of actions, enabling the computing device to:
     monitor, using the sensor processing component, sensor data captured by the at least one device sensor during at least a portion of a time interval in which the sensor processing component is operating in an active state;
     cause the microcontroller to determine that the sensor processing component is instructed to operate in a lower power state than the active state;
     cause the microcontroller to monitor the sensor data;
     cause the microcontroller to detect a potential wake action while the microcontroller is monitoring the sensor data, the potential wake action not requiring any physical contact with the computing device;
     cause the microcontroller to determine that a confidence level for the potential wake action satisfies a threshold value; and
     cause the sensor processing component to monitor the sensor data, and resume operating in the active state.

5. The computing device of claim 4, wherein the device includes a plurality of device sensors of at least two types, and wherein the microcontroller is configured to monitor the device sensors of at least one of the at least two types during at least a portion of a time interval in which the sensor processing component is operating in the lower power state.

6. The computing device of claim 5, wherein the at least two types including at least one of a camera, a gesture sensor, a microphone, an ultrasonic sensor, a capacitive sensor, a resistive sensor, a pressure sensor, an accelerometer, a force sensor, an electronic gyroscope, a magnetometer, a tactile sensor, a temperature sensor, an inertial sensor, or an electronic compass.

7. The computing device of claim 5, wherein the microcontroller is configured to store at least a portion of the sensor data determined to correspond to the potential wake action, and wherein the sensor processing component is configured to obtain at least a portion of the stored sensor data to determine whether the potential wake action corresponds to an actual wake action.

8. The computing device of claim 7, wherein the sensor processing component is configured to obtain data from at least one other type of device sensor to assist in determining whether the potential wake action corresponds to the actual wake action.

9. The computing device of claim 4, wherein the microcontroller is configured to only determine detection of a potential wake action in response to the sensor data matching information stored for a potential wake action with at least a minimum level of confidence.

10. The computing device of claim 4, wherein the microcontroller is further configured to monitor the sensor data captured by at least one of the at least one device sensor and notify the sensor processing component in response to a user action being detected that matches stored information with at least a minimum level of confidence, wherein the stored information at least partially describes a potential user action.

11. The computing device of claim 4, wherein the potential wake action includes at least one of a wave gesture, a spoken command, contact of a user with the computing device, a gaze direction, recognition of a face, a proximity of an object to the computing device, or movement of the computing device.

12. The computing device of claim 4, wherein the processor subsystem further includes at least one application processor configured to execute instructions for an application programmed to perform actions in response to user actions detected using at least one of the microcontroller or the sensor processing component.

13. The computing device of claim 4, wherein the processor subsystem further includes a power management component, and wherein the microcontroller notifies the power management component in response to detecting the potential wake action, the power management component configured to cause the sensor processing component to resume operating in the active state.

14. The computing device of claim 4, wherein the sensor processing component is at least a portion of an application processor.

15. The computing device of claim 4, wherein the at least one device sensor includes a camera and at least one gesture sensor, the gesture sensor having a lower resolution than the camera, the microcontroller configured to capture sensor data captured by the at least one gesture sensor but not by the camera.

16. The computing device of claim 4, wherein the microcontroller and the sensor processing component are connected using at least a pair of general purpose input/output lines for sending notifications.

17. The computing device of claim 4, wherein the sensor processing component is a dedicated processing core of the processing subsystem.

18. A computer-implemented method, comprising:
   monitoring, using a sensor processing component of a processing subsystem of a computing device during at least a portion of a time interval in which the sensor processing component is in an active state, sensor data captured by at least one device sensor of the computing device;
   determining the sensor processing component is instructed to enter a sleep state;
   transferring, using the sensor processing component, responsibility for monitoring the sensor data to a microcontroller of the computing device;
   causing the microcontroller to detect a potential wake action while the microcontroller is performing the monitoring of the sensor data, the potential wake action not requiring any physical contact with the computing device;
   causing the microcontroller to determine that a confidence level for the potential wake action satisfies a threshold value; and
   causing the sensor processing component to reenter the active state and monitor the sensor data.

19. The computer-implemented method of claim 18, further comprising:
   causing the microcontroller to analyze the sensor data to attempt to detect a wake action during at least a portion of a time interval in which the sensor processing component is in the sleep state, wherein the sensor processing component is caused to reenter the active state in response to the microcontroller determining the wake action from the sensor data.

20. The computer-implemented method of claim 18, wherein the microcontroller is configured to operate in a slave mode during at least a portion of a time interval in which the sensor processing component is operating in the active state.

21. The computer-implemented method of claim 18, further comprising:
   causing the sensor processing component to control the at least one device sensor during at least a portion of a time interval in which the sensor processing component is in the active state.

22. A non-transitory computer-readable storage medium including instructions that, when executed, enable a computing device to:
   monitor, using a sensor processing component of a processing subsystem of a computing device during at least a portion of a time interval in which the sensor processing component is in an active state, sensor data captured by at least one device sensor of the computing device;
   determine the sensor processing component is instructed to enter a sleep state;
   transfer, using the sensor processing component, responsibility for monitoring the sensor data to a microcontroller of the computing device;
   cause the microcontroller to detect a potential wake action while the microcontroller is performing the monitoring of the sensor data, the potential wake action not requiring any physical contact with the computing device;
   cause the microcontroller to determine that a confidence level for the potential wake action satisfies a threshold value; and
   cause the sensor processing component to reenter the active state and monitor the sensor data.

23. The non-transitory computer-readable storage medium of claim 22, wherein the instructions when executed further cause the computing device to:
   cause the microcontroller to analyze the sensor data to attempt to detect a wake action during at least a portion of a time interval in which the sensor processing component is in the sleep sate, wherein the sensor processing component is caused to reenter the active state in response to the microcontroller determining the wake action from the sensor data.

24. The non-transitory computer-readable storage medium of claim 22, wherein the instructions when executed further cause the microcontroller to store at least a portion of the sensor data determined to correspond to the potential wake action, the instructions further causing the sensor processing component to obtain at least a portion of the stored sensor data to determine whether the potential wake action corresponds to an actual wake action.

25. The non-transitory computer-readable storage medium of claim 24, wherein the instructions when executed further cause the sensor processing component to obtain data from at least one other type of device sensor to assist in determining whether the potential wake action corresponds to an actual wake action.

* * * * *